United States Patent
Baderdinni et al.

(10) Patent No.: US 8,782,369 B2
(45) Date of Patent: Jul. 15, 2014

(54) APPARATUS TO MANAGE EFFICIENT DATA MIGRATION BETWEEN TIERS

(75) Inventors: Anant Baderdinni, Norcross, GA (US); Gerald E. Smith, Boulder, CO (US); Mark Ish, Sandy Springs, GA (US)

(73) Assignee: LSI Corporation, San Jose, CA (US)

( * ) Notice: Subject to any disclaimer, the term of this patent is extended or adjusted under 35 U.S.C. 154(b) by 180 days.

(21) Appl. No.: 13/296,278

(22) Filed: Nov. 15, 2011

(65) Prior Publication Data
US 2013/0124780 A1 May 16, 2013

(51) Int. Cl.
*G06F 12/00* (2006.01)
*G06F 3/06* (2006.01)

(52) U.S. Cl.
CPC ............ *G06F 3/0646* (2013.01); *G06F 3/0647* (2013.01); *G06F 3/064* (2013.01)
USPC .... 711/165; 711/103; 711/112; 711/E12.002; 711/E12.008

(58) Field of Classification Search
CPC ...... G06F 3/0646; G06F 3/064; G06F 3/0647
USPC .......................................... 711/103, 165, 112
See application file for complete search history.

(56) References Cited

U.S. PATENT DOCUMENTS

| | | | |
|---|---|---|---|
| 8,006,061 B1 | 8/2011 | Chatterjee et al. | |
| 2006/0143417 A1* | 6/2006 | Poisner et al. | 711/164 |
| 2009/0276588 A1 | 11/2009 | Murase | |
| 2010/0281230 A1* | 11/2010 | Rabii et al. | 711/165 |
| 2011/0010514 A1 | 1/2011 | Benhase et al. | |
| 2011/0137889 A1* | 6/2011 | Nayberg | 707/713 |
| 2012/0023300 A1* | 1/2012 | Tremaine et al. | 711/162 |

FOREIGN PATENT DOCUMENTS

EP 2378410 10/2011
WO WO2009032776 3/2009

* cited by examiner

*Primary Examiner* — Aracelis Ruiz
(74) *Attorney, Agent, or Firm* — Suiter Swantz pc llo

(57) ABSTRACT

A data storage system having a slow tier and a fast tier maintains hot data on the fast tier by migrating data from the slow tier to reserve space on the fast tier as data becomes hot over time. The system maintains a reserve space table and performs a mass migration of data from the fast tier to the slow tier. Data migration is frequently unidirectional with data migrating from the slow to the fast tier, reducing overhead during normal operation.

20 Claims, 7 Drawing Sheets

FIG. 3A

| SLOW DATA STORAGE DEVICE | | FAST DATA STORAGE DEVICE | | |
|---|---|---|---|---|
| LBA | | TD LBA | LBA | |
| 0 | | 1000 | 0 | MAPPED EXTENT 1 |
| 1 | | 1001 | 1 | MAPPED EXTENT 2 |
| 2 | | 1002 | 2 | MAPPED EXTENT 3 |
| 3 | | 1003 | 3 | MAPPED EXTENT 4 |
| 4 | | 1004 | 4 | MAPPED EXTENT 5 |
| 5 | | 1005 | 5 | MAPPED EXTENT 6 |
| 6 | | 1006 | 6 | MAPPED EXTENT 7 |
| 7 | | 1007 | 7 | MAPPED EXTENT 8 |
| 8 | | 1008 | 8 | MAPPED EXTENT 9 |
| 9 | | 1009 | 9 | MAPPED EXTENT 10 |
| 10 | | 1010 | 10 | MAPPED EXTENT 11 |
| 11 | | 1011 | 11 | MAPPED EXTENT 12 |
| 12 | | 1012 | 12 | MAPPED EXTENT 13 |
| ... | | ... | ... | |
| 995 | | 1095 | 95 | UNMAPPED EXTENT 1 |
| 996 | | 1096 | 96 | UNMAPPED EXTENT 2 |
| 997 | | 1097 | 97 | UNMAPPED EXTENT 3 |
| 998 | | 1098 | 98 | UNMAPPED EXTENT 4 |
| 999 | | 1099 | 99 | UNMAPPED EXTENT 5 |

FIG. 3B

| LBA | ID |
|---|---|
| 95 | FAST |
| 96 | FAST |
| 97 | FAST |
| 98 | FAST |
| 99 | FAST |

APPARATUS TO MANAGE EFFICIENT DATA MIGRATION BETWEEN TIERS

FIELD OF THE INVENTION

The present invention is directed generally toward data storage systems, and particularly to data storage systems having tiers.

BACKGROUND OF THE INVENTION

In block based storage systems, overall system performance is improved by moving data that is frequently accessed (hot data) to faster and more capable drives and at the same time moving less frequently accessed data (cold data) to less capable slow storage. This solution, known as storage tiering, is more cost effective than using high performance storage for all storage needs. A typical tiering configuration will utilize a large storage pool of cheaper and less capable drives (e.g. SATA drives) as a "slow tier" and a small pool of expensive and more capable drives (e.g. SSDs) as a "fast tier". Tiering provides superior performance per unit cost than other comparable configuration.

For tiering to be effective, hot data must be maintained on the fast tier and cold data must be maintained on the slow tier even as the access frequency of data changes over time. A tiered data storage system tracks the access frequency of data or blocks of data and moves data between tiers as access frequencies change. The movement of data between tiers is an overhead that takes away bandwidth from actually servicing IOs.

Consequently, it would be advantageous if an apparatus existed that is suitable for efficiently migrating data between tiers in a tiered data storage system.

SUMMARY OF THE INVENTION

Accordingly, the present invention is directed to a novel method and apparatus for efficiently migrating data between tiers in a tiered data storage system.

One embodiment of the present invention is a data storage system having a fast tier and a slow tier where a portion of the fast tier is reserved. As previously cold data becomes hot, the data is transferred from the slow tier to the reserved portion of the fast tier. A table initially tracks all of the space in the reserved portion of the fast tier. As data becomes hot and is transferred to the reserved portion of the fast tier, the table is modified to add the previous location of the data on the slow tier to the reserve portion and remove the new location of the data on the fast tier from the reserve portion. By this method, data migration is predominantly from the slow tier to the fast tier without immediate corresponding migrations from the fast tier to the slow tier, thereby reducing the initial overhead of migration. When a certain percentage of the reserve portion has been migrated to the slow tier, the data storage system performs a mass migration of cold data from the fast tier to the slow tier. The timing of the mass migration may be dependent on available system resources.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which:

FIG. 3A shows a table of an initial layout of data blocks in a data storage system having a slow data storage device and a fast data storage device;

FIG. 3B shows an initial table of logical block addresses associated with reserve space on data storage devices in a data storage system having a fast data storage device and a slow data storage device;

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
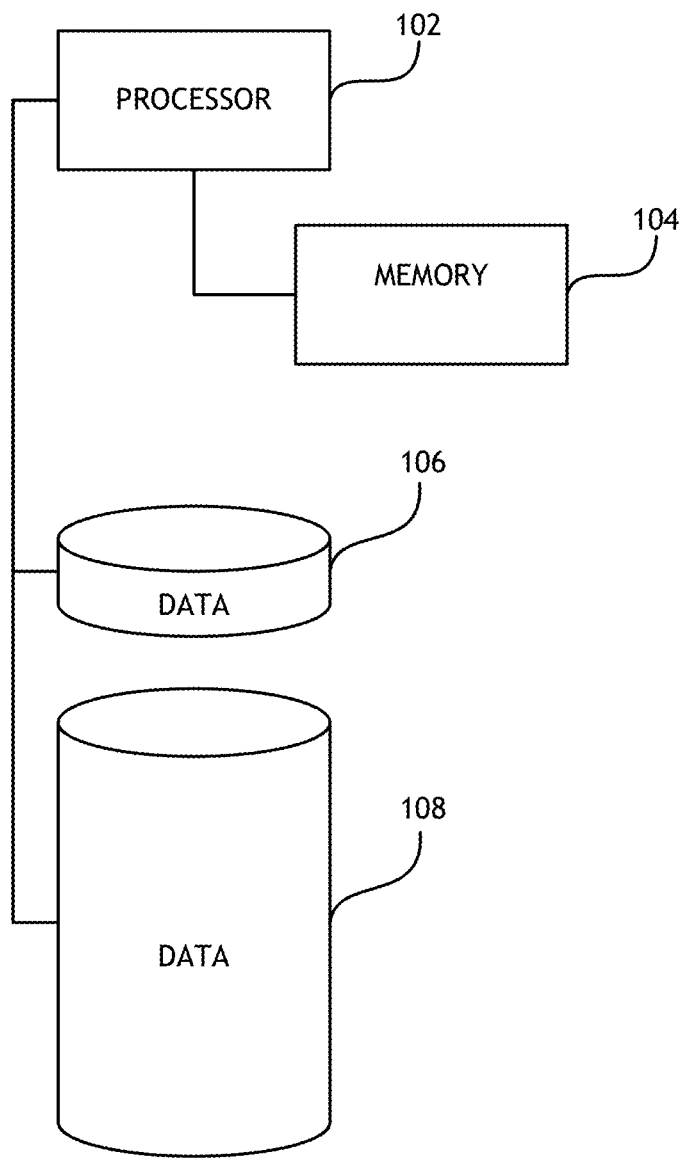
FIG. 1 shows a block diagram of a data storage system useful for implementing the present invention.
Figure 2:
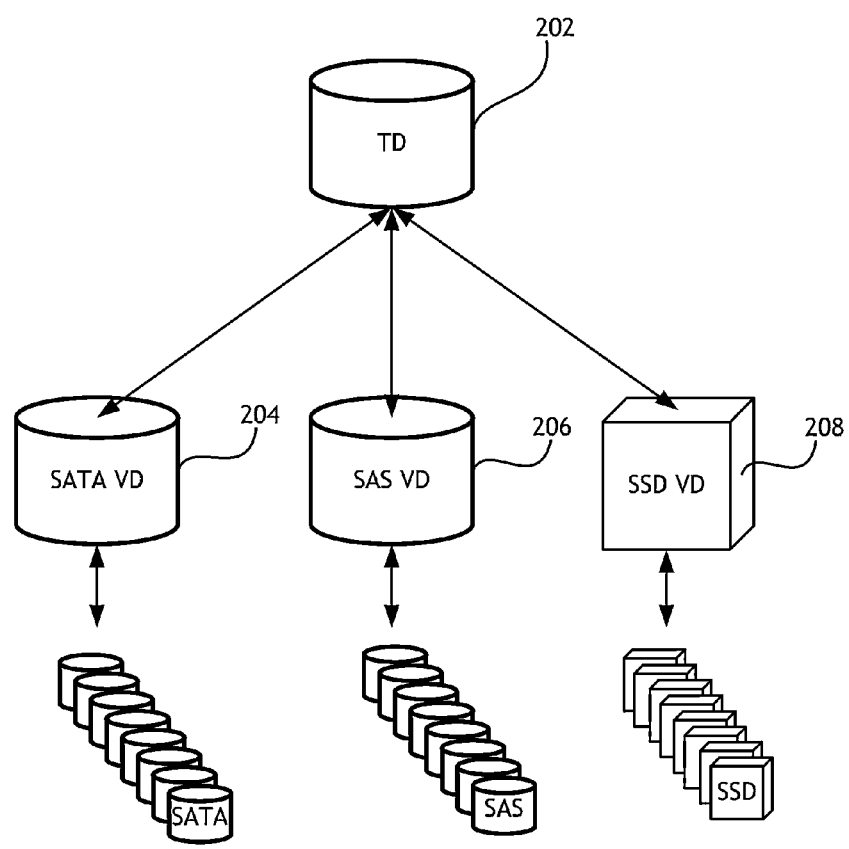
FIG. 2 shows a block diagram of a tiered drive implemented using virtual drives comprising different data storage technologies.

Referring to FIG. 1, a block diagram of a data storage system is shown. A data storage system implementing embodiments of the present invention may include a processor 102, memory 104 connected to the processor, and one or more data storage devices 106, 108. The present invention relates to data migration in a tiered data storage system; therefore, a data storage system implementing embodiments of the present invention may have a fast data storage tier 106 and a slow data storage tier 108. Alternatively, referring to FIG. 2, a data storage system implementing embodiments of the present invention may have one or more logical tiered drives 202 comprising one or more virtual drives 204, 206, 208. Each virtual drive 204, 206, 208 may be a logical construct to access one or more physical drives. For example, a SATA virtual drive 204 may be a logical construct to access a plurality of SATA hard drives; a SAS virtual drive 206 may be a logical construct to access a plurality of SAS hard drives; and a SSD virtual drive 208 may be a logical construct to access a plurality of solid state drives. In a tiered data storage system having one or more tiered drives 202 such as in FIG. 2, each tiered drive 202 may appear to outside users and processes to be a single data storage device with a single, consolidated logical block address (LBA) system.

In order to be effective, a tiered data storage system must maintain the most frequently accessed data (hot data) on the fast tier. The technology used to implement a fast tier carries a higher cost per unit of data storage as compared to the technology used to implement a slow tier; therefore the fast tier may have a relatively small total storage capacity. As different data is accessed over time, data access patterns may change, causing previously cold data to become hot and previously hot data to become cold. A tiered data storage system must therefore migrate data from the slow tier to the fast tier as previously cold data becomes hot. Because the fast tier is relatively small, data which has become cold over time may need to be migrated to the slow tier to free capacity on the fast tier.

A tiered storage device according to the present invention may retain a portion of capacity on the data storage device as reserve space. Referring to FIGS. 3A and 3B, FIG. 3A shows a block diagram of an initial distribution of data in a tiered data storage device having a fast tier 308 and a slow tier 306. The fast tier 308 and the slow tier 306 may be divided into data blocks 314. All data blocks 314 may be an equally sized. Each data block 314 may be assigned a tiered drive logical block address (TD LBA) 310. Each data block may also be assigned a local drive logical block address (LD LBA) particular to a virtual drive such as an SSD VD 208, or particular to a physical drive. Reserve space may initially comprise a plurality of unmapped data blocks 312 in the fast tier. All data blocks 314 on the fast tier may be available for data storage except for the unmapped data blocks comprising the reserve space 312. The unmapped data blocks comprising the reserve space 312 may only be available to a controller for data migration. Reserve space 312 may be some percentage of the total capacity of the fast tier 308; for example, five percent (5%). FIG. 3B shows a reserve space table 302 of unmapped data blocks. Each record 304 in the reserve space table 302 of unmapped data blocks may identify the location of an unmapped data block in the data storage device. Each record 304 in the tables 302 in FIG. 3B identifies each unmapped data block by LD LBA and tier, but one skilled in the art will appreciate that other identification mechanisms may be possible; for example, each unmapped data block may be identified by TD LBA. The reserve space table 302 may be maintained on the fast tier 308.

Figures 4A, 4B:
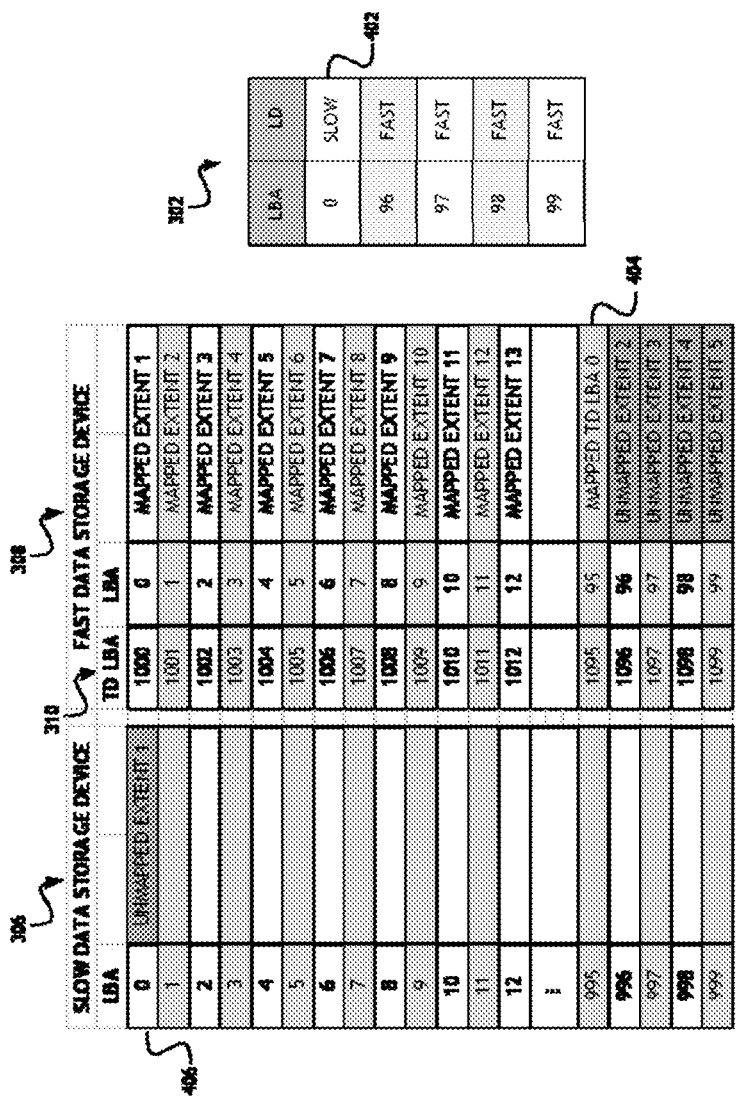
FIG. 4A shows a table of data blocks in a data storage system having a slow data storage device and a fast data storage device after a block of data has been migrated from the slow data storage device to the fast data storage device.
FIG. 4B shows a table of logical block addresses associated with reserve space on data storage devices in a data storage system having a fast data storage device and a slow data storage device after a block of data has been migrated from the slow data storage device to the fast data storage device.

Referring to FIGS. 4A and 4B, FIG. 4A shows a block diagram of a distribution of data in a tiered data storage device having a fast tier 308 and a slow tier 306 where a data block has been migrated from the slow tier 306 to the fast tier 308. The data storage system may analyze data access patterns over time and determine that one or more data blocks on the slow tier 306 have been accessed more frequently than data blocks on the fast tier 308, and are therefore hot. For example, data in a first slow tier data block 406 may become hot due to frequent user or process access over time. In order to maximize data storage system efficiency, the data stored in the first slow tier data block 406 must be transferred to the fast tier 308; however, as illustrated in FIG. 4A, all of the mapped data blocks on the fast tier 308 may be filled. In that case, the data storage system may migrate the data from the first slow tier data block 406 to a first unmapped fast tier data block 404 on the fast tier 308. The reserve space table 302 may then by modified to reflect the migration of data from the first slow tier data block 406 to the first unmapped fast tier data block 404. A first migration record 402 may be updated to refer to the first slow tier data block 406, or a first migration record may be added to the reserve space table 302 to refer to the first slow tier data block 406 while a corresponding record referring to the first unmapped fast tier data block 404 is removed. The first slow tier data block 406 may then become part of the reserve space. Data migration according to the present invention is therefore unidirectional for the first data migration; that is, the data storage system did not migrate data from a data block on the fast tier to make room for data from a data block on the slow tier. Data migration according to the present invention incurs a correspondingly lower overhead as compared to data migration in a conventional tiered data storage system.

Figures 5A, 5B:
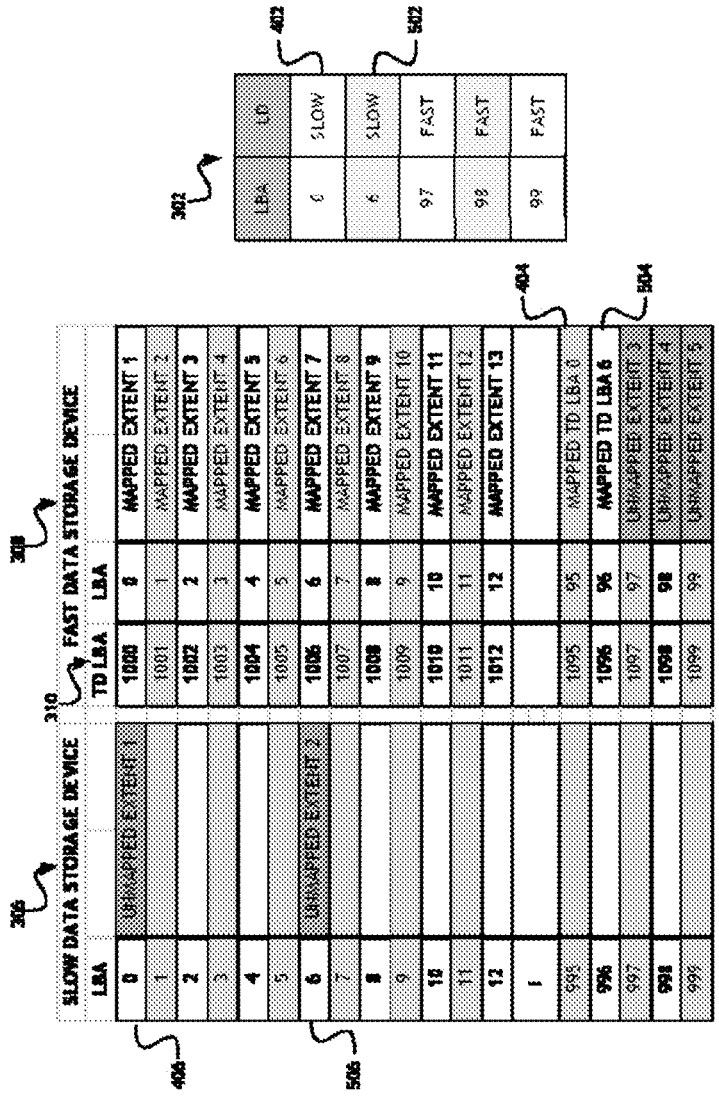
FIG. 5A shows a table of data blocks in a data storage system having a slow data storage device and a fast data storage device after two blocks of data have been migrated from the slow data storage device to the fast data storage device.
FIG. 5B shows a table of logical block addresses associated with reserve space on data storage devices in a data storage system having a fast data storage device and a slow data storage device after two blocks of data have been migrated from the slow data storage device to the fast data storage device.

Referring to FIGS. 5A and 5B, FIG. 5A shows a block diagram of a distribution of data in a tiered data storage device having a fast tier 308 and a slow tier 306 where two data blocks have been migrated from the slow tier 306 to the fast tier 308. Where the data storage system determines that two data blocks on the slow tier 306 have been accessed more frequently than data blocks on the fast tier 308, and are therefore hot, the data storage system may migrate the data from a first slow tier data block 406 to a first unmapped fast tier data block 404 on the fast tier 308 and modify the reserve space table 302 as illustrated in FIGS. 4A and 4B. The data storage system may then migrate the data from a second slow tier data block 506 to a second unmapped fast tier data block 504 on the fast tier 308. The reserve space table 302 may then by modified to reflect the migration of data from the second slow tier data block 506 to the second unmapped fast tier data block 504. A second migration record 502 may be updated to refer to the second slow tier data block 506, or a second migration record may be added to the reserve space table 302 to refer to the second slow tier data block 506 while a corresponding record referring to the second unmapped fast tier data block 504 is removed. The second slow tier data block 506 may then become part of the reserve space. Data migration according to the present invention therefore continues to be unidirectional even for more than one data migration. Data migration according to the present invention incurs a correspondingly lower overhead as compared to data migration in a conventional tiered data storage system.

Figures 6A, 6B:
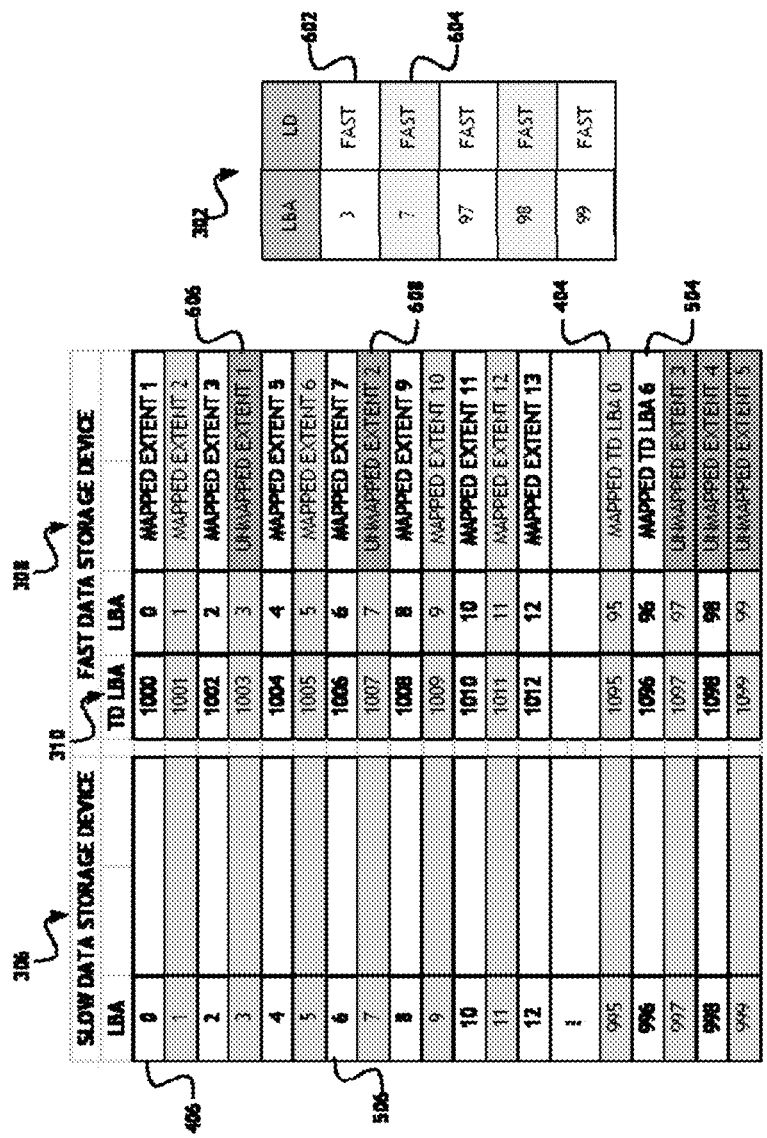
FIG. 6A shows a table of data blocks in a data storage system having a slow data storage device and a fast data storage device after a cold swap to move reserve space back to the fast data storage device.
FIG. 6B shows a table of logical block addresses associated with reserve space on data storage devices in a data storage system having a fast data storage device and a slow data storage device after a cold swap to move reserve space back to the fast data storage device.

Referring to FIGS. 6A and 6B, FIG. 6A shows a block diagram of a distribution of data in a tiered data storage device having a fast tier 308 and a slow tier 306 where the data storage system has undergone a "cold swap" to return reserve space to the fast tier 308 through a mass migration of data from one or more data blocks on the fast tier 308 to the slow tier 306. During the operation of a data storage system according to the present invention, reserve space initially allocated on the fast tier 308 (see reserve space 312 in FIG. 3A) eventually migrates to the slow tier 306 as data on the slow tier 306 becomes hot and is migrated to unmapped data blocks in the reserve space on the fast tier 308.

Each migration of data from a data block on the slow tier 306 is accompanied by a corresponding migration of reserve space from the fast tier 308 to the slow tier 306 through a reserve space table 302 that records the location of each data block of reserve space. By track data blocks of reserve space on the slow tier 306, the data storage system retains sufficient space on the slow tier to periodically migrate cold data from data blocks on the fast tier 308 as hot data is migrated to the fast tier 308 over time.

The data storage system may include a migration threshold. The migration threshold may be some limit on the amount of reserve space that may be transferred from the slow tier 306 to the fast tier 308. The migration threshold may be a percentage of the initial reserve space such as eighty percent (80%), though those skilled in the art will appreciate that 80% is exemplary and that other thresholds may be employed. When the migration limit is reached, the data storage system may initiate a "cold swap." A cold swap is a process for returning reserve space to the fast tier 308 by migrating cold data from data blocks on the fast tier to data blocks on the slow tier identified in the reserve space table 302. Alternatively, a cold swap may be initiated at predetermined intervals, or when system usage is below a threshold such that the cold swap will not reduce end user performance of the data storage system.

Where the data storage system determines that a cold swap should be initiated, the data storage system determines what data has on the fast tier 308 has become cold. For example, the data storage system may determine that two data blocks 606, 608 on the fast tier 308 have been accessed less frequently than other data blocks on the fast tier 308, and are therefore cold. The data storage system may migrate the data from a first fast tier data block 606 to a first slow tier data block 406 identified as reserve space by a migration record in the reserve space table 302 (see the first migration record 402 in FIG. 5A). The migration record 602 identifying the first slow tier data block 406 may be updated to refer to the first fast tier data block 606, or a migration record 602 may be added to the reserve space table 302 to refer to the first fast tier data block 606 while a corresponding record referring to the first slow tier data block 406 is removed. The data storage system may then migrate the data from a second fast tier data block 608 to a second slow tier data block 506 identified as reserve space by a migration record in the reserve space table 302 (see the second migration record 502 in FIG. 5A). The migration record 604 identifying the second slow tier data block 506 may be updated to refer to the second fast tier data block 608, or a migration record 604 may be added to the reserve space table 302 to refer to the first second tier data block 608 while a corresponding record referring to the second slow tier data block 506 is removed. During a cold swap, data from a plurality of data blocks on the fast tier 308 is migrated to the slow tier 306 at one time to predetermined locations on the slow tier 306 identified in the reserve space table.

Figure 7:
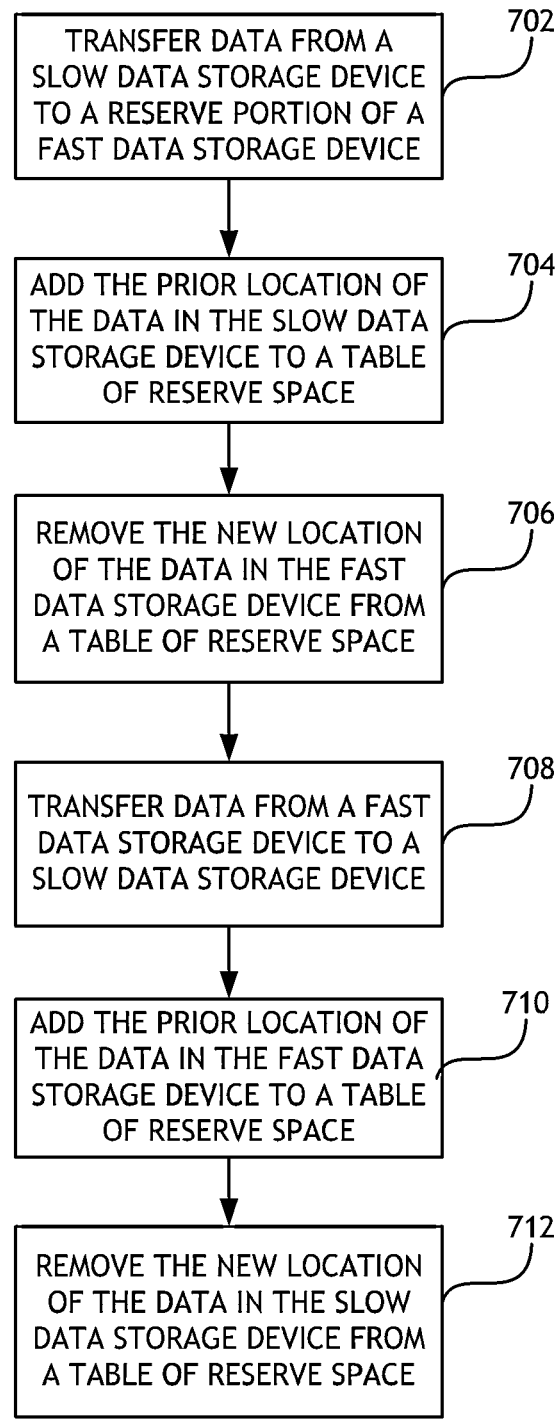
FIG. 7 shows a flowchart of a method for migrating data in a data storage system having a slow data storage device and a fast data storage device.

Referring to FIG. 7, a flowchart for an embodiment of the present invention is shown. A tiered data storage system having at least one slow tier, or slow data storage device, and at least one fast tier, or fast data storage device, may maximize availability of the data storage system to handle data requests by reducing overhead of data migration operations during heavy usage periods. Where the data storage system determines that data on the slow data storage system has become hot based on data access patterns, the data storage system may transfer 702 data from a data block on the slow data storage device to a reserve space data block on the fast data storage device. Reserve space data blocks are data blocks identified in a reserve space table. Reserve space data blocks are not allocated for regular usage by the data storage system and are held in reserve specifically for data migration operations. When data has been transferred from a data block on the slow data storage device to a data block on the fast data storage device, the data storage system may add 704 the data block on the slow data storage device, where the data was previously located, to the reserve space table. The data block where the data was previously located may then become part of the reserve space and may no longer be available for regular usage by the data storage system; only for data migration operations. The data storage system may then remove 706 the data block on the fast data storage device, where the data was transferred, from the reserve space table. The data block on the fast data storage device may then be available for regular usage by the data storage device.

When the reserve space table indicates that some threshold amount of the reserve space has been transferred to the slow data storage device, the data storage system may initiate a cold swap to return reserve space to the fast data storage device. The data storage device may transfer 708 cold data from a data block on the fast data storage device to data block on the slow data storage device identified in the reserve space table. Cold data on the fat data storage device may refer to the data or data block on the fast data storage device that is least frequently accessed by users or processes. When data has been transferred from the data block on the fast data storage device to the data block on the slow data storage device, the data storage system may add 710 the data block on the fast data storage device, where the data was previously located, to the reserve space table. The data block where the data was previously located may then become part of the reserve space and may no longer be available for regular usage by the data storage system; only for data migration operations. The data storage system may then remove 712 the data block on the slow data storage device, where the data was transferred, from the reserve space table. The data block on the data storage device may then be available for regular usage by the data storage device. A cold swap may transfer a plurality of reserve space data blocks from the slow data storage system to the fast data storage system. Reserve space transfers would generally proceed as set forth herein, transferring data from the fast tier to the slow tier and updating the reserve space table.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A data storage apparatus comprising:
   a processor;
   a first data storage device connected to the processor, configured to store a reserve space table of unmapped data blocks; and
   a second data storage device connected to the processor, wherein:
   the first data storage device has a relatively faster access time than the second data storage device;
   the reserve space table is configured to identify discrete portions of the first data storage device and discrete portions of the second data storage device; and
   the processor is configured to:
   transfer data from a discrete portion of the second data storage device to a discrete portion of the first data storage device identified in the reserve space table;

after transferring data from the discrete portion, add a location of the discrete portion of the second data storage device to the reserve space table and remove a location of the discrete portion of the first data storage device from the reserve space table;

transfer data from a plurality of discrete portions of the first data storage device to a plurality of discrete portions of the second data storage device;

after transferring data from the plurality of discrete portions add a plurality of locations, each associated with one of the plurality of discrete portions of the first data storage device to the reserve space table and remove a plurality of locations, each associated with one of the plurality of discrete portions of the second data storage device from the reserve space table.

2. The data storage apparatus of claim 1, wherein the processor is further configured to monitor a distribution of locations in the reserve space table between the first data storage device and the second data storage device.

3. The data storage apparatus of claim 1, wherein the first data storage device comprises one or more solid state drives.

4. The data storage apparatus of claim 1, wherein the second data storage device comprises one or more hard disk drives.

5. The data storage apparatus of claim 1, wherein the processor is further configured to prohibit data access operations to any location identified in the reserve space table.

6. A data storage apparatus comprising:
a processor;
a first data storage device connected to the processor, configured to store a reserve space table of unmapped data blocks; and
a second data storage device connected to the processor, wherein:
the first data storage device has a relatively faster access time than the second data storage device;
the reserve space table is configured to identify discrete portions of the first data storage device and discrete portions of the second data storage device; and
the processor is configured to:
transfer data from a discrete portion of the second data storage device to a discrete portion of the first data storage device identified in the reserve space table;
after transferring data from the discrete portion, add the discrete portion of the second data storage device to the reserve space table and remove the discrete portion of the first data storage device from the reserve space table.

7. The data storage apparatus of claim 6, wherein the processor is further configured to monitor a distribution of locations in the reserve space table between the first data storage device and the second data storage device.

8. The data storage apparatus of claim 7, wherein the processor is further configured to:
transfer data from a plurality of discrete portions of the first data storage device to a plurality of discrete portions of the second data storage device when the distribution of locations in the reserve space table exceeds a threshold;
after transferring data from the plurality of discrete portions, add a plurality of locations, each associated with one of the plurality of discrete portions of the first data storage device to the reserve space table and remove a plurality of locations, each associated with one of the plurality of discrete portions of the second data storage device from the reserve space table.

9. The data storage apparatus of claim 8, wherein the threshold is eighty percent of all locations identified in the reserve space table referencing a location on the second data storage device.

10. The data storage apparatus of claim 6, wherein the processor is further configured to monitor a system usage metric.

11. The data storage apparatus of claim 10, wherein the processor is further configured to:
transfer data from a plurality of discrete portions of the first data storage device to a plurality of discrete portions of the second data storage device when the system usage metric is below a threshold;
after transferring data from the plurality of discrete portions, add a plurality of locations, each associated with one of the plurality of discrete portions of the first data storage device to the reserve space table and remove a plurality of locations, each associated with one of the plurality of discrete portions of the second data storage device from the reserve space table.

12. The data storage apparatus of claim 6, wherein the first data storage device comprises one or more solid state drives.

13. The data storage apparatus of claim 6, wherein the second data storage device comprises one or more hard disk drives.

14. The data storage apparatus of claim 6, wherein the processor is further configured to prohibit data access operations to any location identified in the reserve space table.

15. A method for migrating data between tiers in a data storage system, comprising:
transferring data from a discrete portion of a slow data storage device to discrete portion of a fast data storage device;
after transferring data from the discrete portion, adding the discrete portion of the slow data storage device to a reserve space table and removing the discrete portion of the fast data storage device from the reserve space table of unmapped data blocks.

16. The method of claim 15, further comprising monitoring a distribution of locations in the reserve space table between the slow data storage device and the fast data storage device.

17. The method of claim 16, further comprising:
transferring data from a plurality of discrete portions of the fast data storage device to a plurality of discrete portions of the slow data storage device when the distribution of locations in the reserve space table exceeds a threshold;
after transferring data from the plurality of discrete portions adding a plurality of locations, each associated with one of the plurality of discrete portions of the fast data storage device to the reserve space table and removing a plurality of locations, each associated with one of the plurality of discrete portions of the slow data storage device from the reserve space table.

18. The method of claim 17, wherein the threshold is eighty percent of all locations identified in the reserve space table referencing a location on the slow data storage device.

19. The method of claim 15, wherein the fast data storage device comprises one or more solid state drives.

20. The method of claim 15, further comprising prohibiting data access operations to any location identified in the reserve space table.

* * * * *